(12) United States Patent
Barclay et al.

(10) Patent No.: US 8,000,735 B1
(45) Date of Patent: Aug. 16, 2011

(54) WIRELESS MODEM ARCHITECTURE FOR REDUCING MEMORY COMPONENTS

(75) Inventors: Michael Barclay, Salisbury (GB); Terry Lynn Cole, Austin, TX (US); Richard Powell, Maidenhead (GB); William M. Johnson, Austin, TX (US); David W. Smith, Cedar Park, TX (US); Ralf Findeisen, Dresden (DE); Derek Golightly, Steyning (GB)

(73) Assignee: GlobalFoundries Inc., Grand Cayman (KY)

( * ) Notice: Subject to any disclaimer, the term of this patent is extended or adjusted under 35 U.S.C. 154(b) by 1532 days.

(21) Appl. No.: 11/001,491

(22) Filed: Dec. 1, 2004

(51) Int. Cl.
*H04M 1/00* (2006.01)

(52) U.S. Cl. ..................... 455/550.1; 455/418

(58) Field of Classification Search .............. 718/107; 455/550.1; 712/32–37
See application file for complete search history.

(56) References Cited

U.S. PATENT DOCUMENTS

| | | | |
|---|---|---|---|
| 6,295,314 B1 | 9/2001 | Cole | 375/222 |
| 6,338,130 B1 * | 1/2002 | Sinibaldi et al. | 718/107 |
| 6,714,589 B1 | 3/2004 | Cole | 375/222 |
| 7,069,452 B1 * | 6/2006 | Hind et al. | 713/1 |
| 2002/0068608 A1 * | 6/2002 | Souissi | 455/557 |
| 2002/0098864 A1 * | 7/2002 | Mukai et al. | 455/552 |
| 2003/0031148 A1 | 2/2003 | Schmidt et al. | 370/337 |
| 2004/0186914 A1 * | 9/2004 | Shimada | 709/238 |

OTHER PUBLICATIONS

University of Aberdeen, Examination Solutions for Course EG 3561 www.erg.abdn.ac.uk/users/gorry/course/exams/EG3561-98-1-Solution.pdf, Jan. 10, 2001, 13 pages.
P. Bettler, "A Single Processor Communication Engine Solution for Wireless Handsets and Convergence Devices," www.techonline.com/community/ed_resource/36757, publication date Jun. 17, 2004.
"Mobile Extreme Convergence," Freescale Semiconductor, Inc., 2004, 4 pages.

* cited by examiner

*Primary Examiner* — Lester Kincaid
*Assistant Examiner* — Daniel Lai
(74) *Attorney, Agent, or Firm* — Hamilton & Terrile, LLP; Michael Rocco Cannatti

(57) ABSTRACT

A wireless communications device includes a host processing unit, a modem processing unit, and a memory transport interface. The wireless communications device typically runs a variety of software tasks, some of which require considerably more memory than others. By processing the memory intensive tasks with the host processing unit and assigning tasks requiring high computing power but relatively smaller memory to the modem processor unit, a smaller on-chip memory can be used for the modem processor unit tasks. In addition, by using a messaging transport interface to transfer data between tasks running on different processing units, smaller local memories can be used in place of a shared memory. For example, by allocating and storing L1 tasks at the modem processing unit and allocating/storing L2 and L3 tasks at the host processing unit, duplicate memory components may be reduced or removed, thereby lowering system costs and improving system efficiency.

14 Claims, 3 Drawing Sheets

WIRELESS MODEM ARCHITECTURE FOR REDUCING MEMORY COMPONENTS

BACKGROUND OF THE INVENTION

1. Field of the Invention

The present invention relates generally to the field of wireless communication technology. In one aspect, the present invention relates to an improved architecture and partitioning of resources in a wireless or mobile communication device.

2. Description of the Related Art

In recent years, wireless communications devices have become increasingly popular. A cellular telephone is one example of a wireless communications device, though such devices can take on various forms other than a cellular telephone, including a computer (e.g., a PDA or notebook computer) with mobile communication capabilities. Existing wireless communications devices, such as mobile or cellular phone devices, are often constructed as a combination of a modem device and an applications processor that are implemented with multiple CPUs. These wireless devices must be able to communicate with other wireless devices using established network communications protocols, such as defined by the Open Systems Interconnection (OSI) reference model, which sets forth a multi-layer communications networking framework for implementing data transfer protocols. Specific communication tasks between wireless devices are primarily controlled at the bottom three layers (physical, data link and network) in the OSI reference model, while the layers above (L4 through L7) primarily relate to application programs that are built using the services provided by the network.

Wireless communications devices having a layered architecture use the first layer (referred to as the physical layer (PHY) or L1 or DSP) for signal processing functions, such as error checking, modulating, demodulating, scrambling, etc., that are used for controlling the actual transmission of a data-carrying signal across the transmission medium. Signals or messages provided by the physical layer are often referred to as primitive signals, as they do not require interaction with higher levels for detection. Thus, the L1 layer (physical layer) sits close to the RF (radio frequency) A/D and D/A converters in the analog front end, and requires heavy signal processing (multiply and accumulate—MAC functions). The processing tasks at the L1 layer are time-sensitive processes, in the sense that a delay in servicing the L1 processing task by a multi-tasking host processor can cause the communication connection to be dropped. However, these L1 processing tasks do not consume significant memory size for software code, because it is made of few, repetitive, and computationally intensive, small kernels for data analysis and signal manipulation.

The second layer (referred to as layer 2 or L2) processes digital data received by the physical layer to identify information contained therein, and is responsible for data framing and management functions. The third layer (referred to as layer 3 or L3) is responsible for overall coordination of all systems along the communications path. The L2 and L3 layers typically consume less computational bandwidth and processing power than the L1 layer, and do not involve time-critical processes. However, the L2 and L3 layers have more memory intensive requirements, in that these layers contain code that handles the communication protocol made of a complex state machine.

Conventional wireless communications solutions use a modem device to transmit and receive computer data wirelessly. Some real-time functions of traditional hardware modems are being implemented as software routines, due to, among other things, less expensive manufacturing of such modems and their increased flexibility. These software routines are typically executed on a host computer running under a multi-tasking operating system (OS), such as the Microsoft Windows® OS. For example, a conventional solution is to use a microcontroller unit (MCU) and/or a digital signal processor (DSP) device to provide the wireless modem function, and to use one or more additional CPUs to provide the applications processor function. With such conventional solutions, the wireless modem unit is used to implement the L1, L2 and L3 processes. An example would be the Texas Instruments TBB2100 single-chip system which uses a microcontroller unit (MCU) and a digital signal processor (DSP) device to provide the wireless modem function, and requires two additional CPUs to provide the applications processor function. Another example of such a conventional solution is depicted in FIG. 1, which illustrates with a hardware block diagram how the lower OSI layers are implemented with a conventional wireless communication solution.

As shown in FIG. 1, the signaling protocol and application layers 10-14 are performed by a multi-CPU device 1 that includes a baseband processing section 20 and an applications processing (AP) section 30. In particular, the baseband processing section 20 uses a DSP 21 and MCU 23, each having a large embedded SRAM (e.g., 512KB SRAM 24) and a large external flash memory (e.g., 4 MB flash memory 25) and each accessing a shared memory 22. The applications processing section 30 uses one or more CPUs to handle the application layer processes using a large (e.g., 32 MB) SRAM 31 and flash memory 32. In this configuration, the DSP 21 and/or MCU 23 perform all of the signaling protocol layers (L1/L2/L3) within the baseband processing section 20, while the applications processor 30 performs any application layer processes. This allocation of processing functions is indicated by the partition line 15 (which separates the DSP functions 10 processed by DSP 21 from the L1/L2/L3 functions 11-13 processed by the MCU 23) and the partition line 16 (which separates the L1/L2/L3 functions 11-13 processed by the MCU 23 from the application program functions 14 processed by the AP 30). There are a number of drawbacks and limitations that result from such conventional solutions, including but not limited to high manufacturing costs for providing multiple CPUs with large flash and embedded SRAM memories and requiring use of a shared memory. In addition, there can be timing related connection problems created by grouping all of the signal protocol layers on the same MCU, regardless of the time criticality of the individual layer processes. And by lumping all of the signaling protocol layers (L1/L2/L3) in the baseband processing section 20, conventional solutions make inefficient use of system resources, have unnecessarily high power consumption and/or may be susceptible to security attacks.

Therefore, a need exists for an improved wireless communications device and methodology which efficiently implements the wireless communication functions with fewer component CPU and memory parts, lower cost, fewer connection drops, more efficient use of system resources, reduced power and/or improved security. Further limitations and disadvantages of conventional systems will become apparent to one of skill in the art after reviewing the remainder of the present application with reference to the drawings and detailed description which follow.

SUMMARY OF THE INVENTION

By allocating the software tasks that run on the baseband processor (BBP) and the applications processor (AP) so that memory intensive tasks are processed by the applications processor, the baseband processor is able to process tasks requiring high computing power but low memory requirements using a smaller on-chip memory embedded in the baseband processor. For example, memory intensive processing tasks associated with the L2 and L3 signaling protocols can be serviced by the AP without consuming a significant part of the AP memory, thereby allowing use of a smaller BBP memory to service the processing tasks associated with the L1 signaling protocol. As a result, a large embedded SRAM memory and a large external flash memory in the baseband processor can be replaced with a smaller embedded RAM and ROM memory. With this approach, duplicate memory components (such as embedded SRAM and flash memory in the baseband processor) can be replaced with a smaller on-chip memory.

In accordance with one or more embodiments of the present invention, a wireless communications device, system and methodology are provided with a memory-efficient architecture for allocating signal processing tasks. In an illustrative example, the wireless communications device includes an application processor constructed with a MIPS CPU core and a relatively large DDR SDRAM and/or flash memory. The application processor performs L2 and L3 signal processing tasks using a local AP memory for storing the L2 and L3 signal processing tasks along with other application programs and software. In addition, the wireless communications device includes a modem processor constructed with a single DSP core or a RISC processor with DSP instructions that performs L1 signal processing tasks using a relatively small embedded local memory (e.g., RAM and/or ROM) for storing DSP and L1 signal processing tasks. In a selected embodiment, the L1 signal processing tasks are stored in a relatively small ROM memory embedded in the modem processor which stores firmware for the modem processor. This firmware may be updated or patched by providing the embedded local memory with a RAM for storing patch code, and by executing firmware instructions that cause the modem processor to write patch data from the patch code to an address in the RAM specified by the patch code so that all or part of every function stored in the ROM may be replaced by patch data supplied by the RAM. In accordance with another selected embodiment, a memory transport mechanism is provided in each processor for transporting a copy of data stored in a local memory of a source processor to a local memory of a destination processor using a message-based interface, where the source and destination processors do not share a common memory. According to the message-based interface, a source processor generates a data message that includes a copy of the data stored in a local memory of the source processor unit. The data message also includes a local memory pointer to a local memory address where the data is stored in the source processor. When the data message is received at the destination processor, a copy of the data is stored in a local memory of the destination processor and a second message is generated that includes a second local memory pointer to a local memory address where a copy of the data is stored in the destination processor. As a result, a task at the destination processor can process data generated by a copy of the underlying task data that is referenced in local memory using a local memory pointer.

The objects, advantages and other novel features of the present invention will be apparent to those skilled in the art from the following detailed description when read in conjunction with the appended claims and accompanying drawings.

DETAILED DESCRIPTION

While illustrative embodiments of the present invention are described below, it will be appreciated that the present invention may be practiced without the specified details, and that numerous implementation-specific decisions may be made to the invention described herein to achieve the developer's specific goals, such as compliance with system-related and business-related constraints, which will vary from one implementation to another. While such a development effort might be complex and time-consuming, it would nevertheless be a routine undertaking for those of ordinary skill in the art having the benefit of this disclosure. For example, selected aspects are shown in block diagram form, rather than in detail, in order to avoid obscuring the present invention. Such descriptions and representations are used by those skilled in the art to describe and convey the substance of their work to others skilled in the art. The present invention will now be described with reference to the drawings described below.

Figure 2:
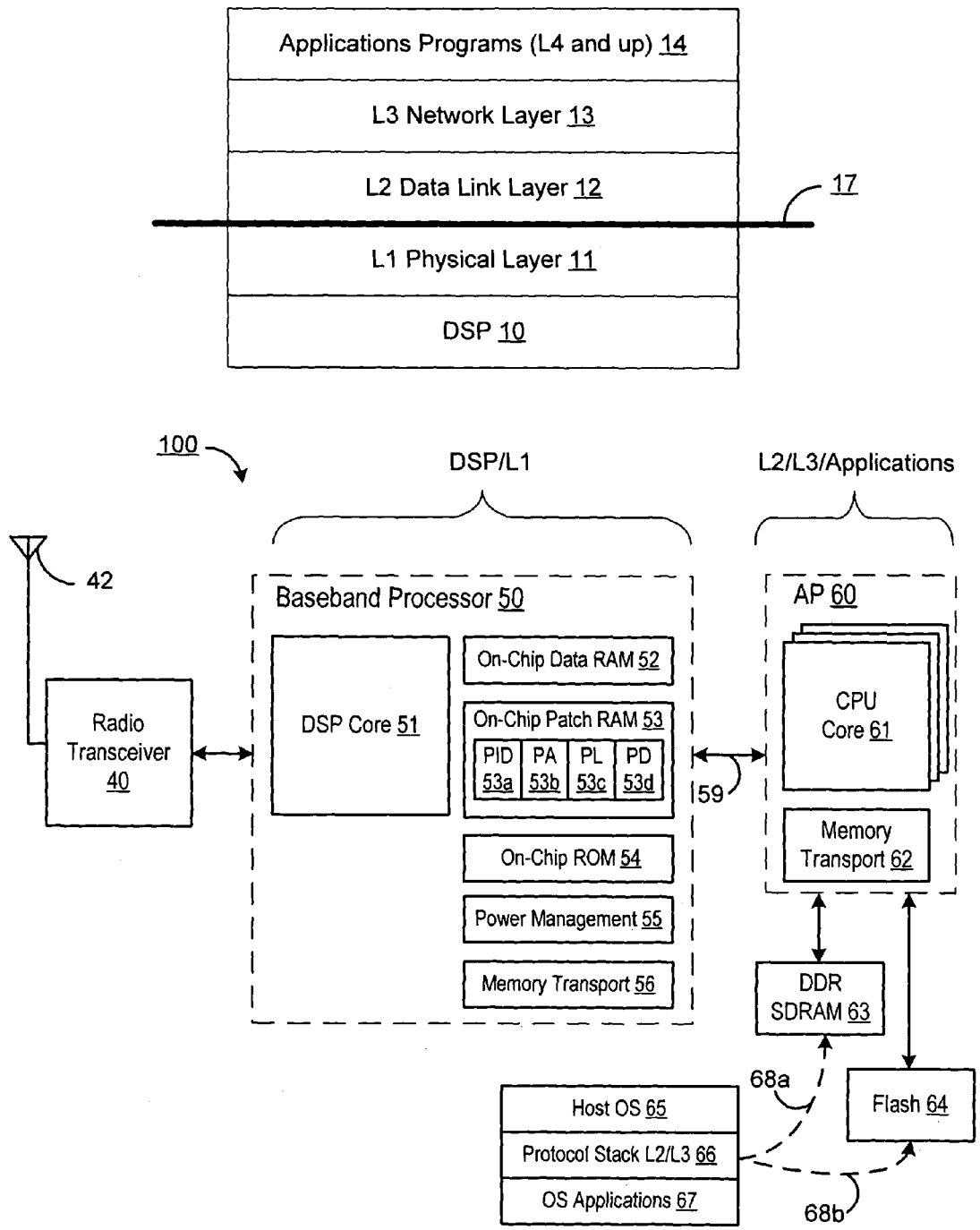
FIG. 2 shows a block diagram representation of an exemplary wireless communications device constructed in accordance with the present invention.

Referring to FIG. 2, a block diagram representation of an exemplary wireless communications device 100 in accordance with the present invention is provided. In addition to being implemented as a wireless communications device, the present invention may also be implemented on mobile devices, such as personal digital assistants, mobile or cellular phones, smart phones and other mobile devices that include programmable capabilities such as telecommunications, global position system (GPS) detection, camera or video imaging, multimedia messaging (MMS), Internet features and the like. In addition, the present invention may be implemented in a mobile computing device using a software modem to communicate in accordance with a wireless communication protocol, such as GSM, V.90, ADSL, HomePNA, Wireless LAN, etc. As depicted in FIG. 2, the communication device 100 includes a host or applications processing unit 60, a baseband processing unit 50, a radio unit 40 and an antenna 42 for transmission and reception over a wireless communication link using an industry standard signal modulation and communication protocol, such as IEEE 802.11, 802.15, 802.16, 802.18, 802.19, 802.20, Bluetooth (BT), advanced mobile phone services (AMPS), digital AMPS, GSM, CDMA, LMDS, MMDS and/or variations thereof. With such wireless and mobile device applications, reduced power consumption may be achieved in accordance with the present invention by eliminating external memory and the attendant power consumption needed to signal and retrieve data at high rates with such external memories. For clarity and ease of understanding, not all of the elements making up the wireless communications device 100 are described in detail. Such details are well known to those of ordinary skill in the art, and may vary based on the particular computer vendor and microprocessor type. Moreover, the wireless communications device 100 may include other buses, devices, and/or subsystems, depending on the implementation desired. For example, the wireless communications device 100 may include caches, modems, parallel or serial interfaces, SCSI interfaces, network interface cards, and the like.

As depicted, the host unit 60 includes one or more central processing units or cores 61 and a main memory system that includes a large DDR SDRAM 63 and a large flash memory unit 64, either or both of which may be integrated with or external to the host unit 60. In the illustrated embodiment, the CPU core 61 executes one or more multi-tasking operating systems 65 stored in the host flash memory 64 and/or SDRAM 63 (as indicated optionally by the dashed arrows 68a, 68b). In addition, the flash memory 64 and/or SDRAM memory 63 stores L2 and L3 protocol stack software 66 and other OS application software 67 for execution by the CPU core 61. In the illustrated embodiment, the multi-tasking operating system software 65 may not always provide adequate resources from the CPU 61 to maintain continuous operation of all of the signaling protocol layers (L1/L2/L3) and the other application software 67, especially given the time-sensitive requirements of the L1 processing tasks. To address this situation, the signaling protocol layers are partitioned in the wireless communications device architecture so that the baseband processing unit 50 handles the L1 processing tasks, while the host unit 60 handles the L2 and L3 processing tasks. This allocation of processing functions is indicated by the partition line 17 which separates the DSP/L1 functions 10-11 processed by DSP 51 from the L2/L3 functions 12-13 and the application program functions 14 processed by the CPU core 61.

Figure 1:
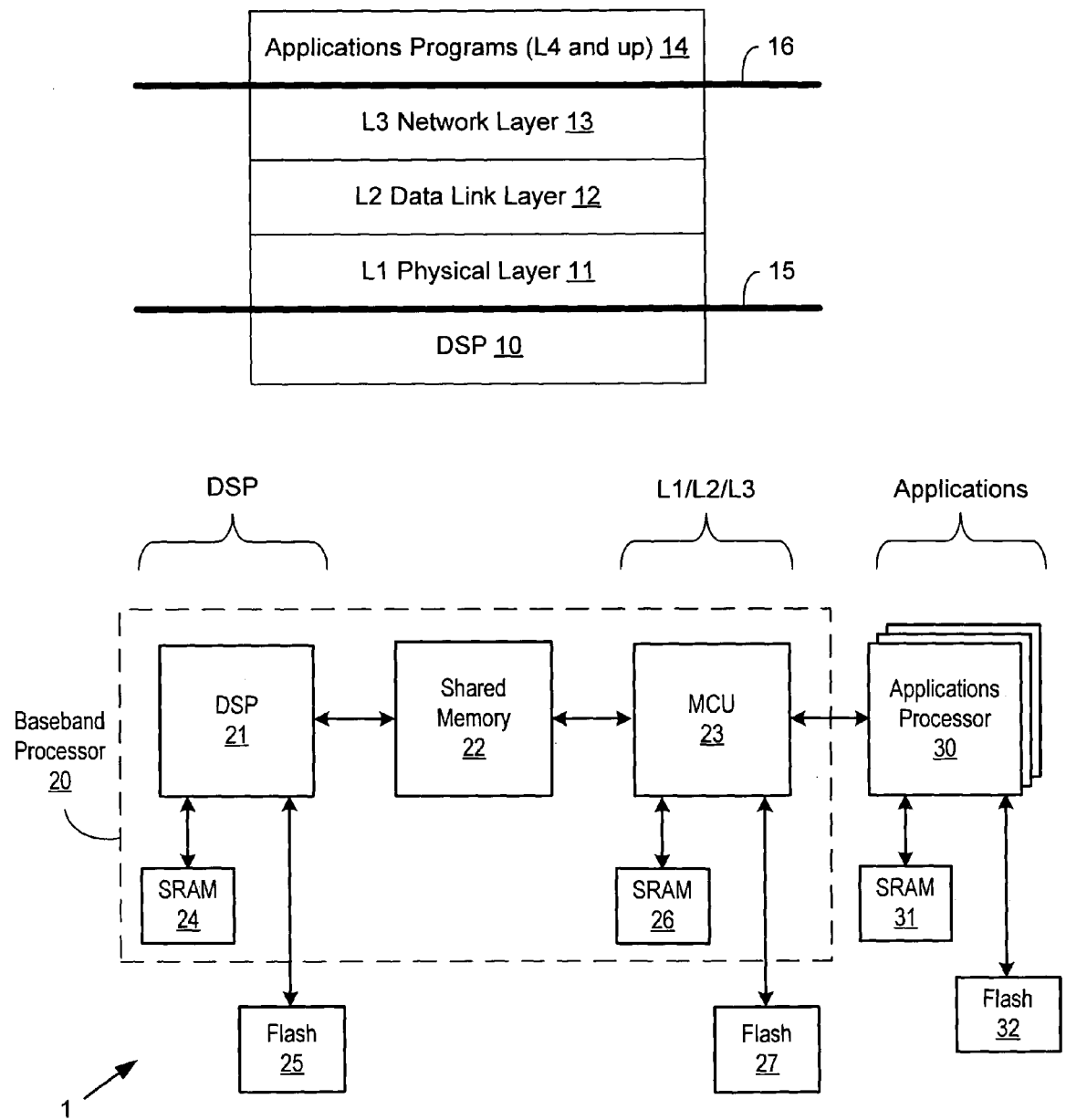
FIG. 1 is a block diagram representation of a conventional wireless communications device.

In particular and as depicted in FIG. 2, the baseband processing unit 50 includes a specialized programmable processor or hardware device and a relatively small embedded BBP memory that performs certain modem tasks not performed by the host unit 60. For example, the baseband processing unit 50 may be implemented to include a DSP core 51 having on-chip RAM 52 and on-chip ROM 54. By partitioning the signaling protocol layers as described above, the time sensitive L1 processing tasks may be contained in the relatively small embedded BBP memory since these tasks do not require significant memory resources. As a result, where conventional wireless devices would store the combined signaling protocol layers (L1/L2/L3) in a large 4 MB external flash memory as part of the baseband processor (e.g., a flash memory 27 depicted in FIG. 1), the present invention stores only the L1 processing tasks in the embedded BBP memory since the relatively small size of the L1 processing task code can fit in a small (e.g., 1 MB) embedded ROM memory 54. With this arrangement, the broadband processing unit 50 handles the time-sensitive L1 processing portion of the signaling protocol layers for the wireless communications device 100. In effect, a relatively small and inexpensive embedded ROM memory can replace a large embedded SRAM memory and a large external flash memory since the L2 and L3 processing tasks may be stored in the host flash memory 64 without significantly impairing the performance of the host unit. This is because the L2 and L3 software requirements typically take up less than five percent of the host memory resources.

In addition to reducing the required number, size and cost of baseband processor memory resources, the partitioning of the processing tasks for the signaling protocol layers between the baseband processing unit and the host unit increases the stability and reliability of the wireless communications. The increased stability and reliability results from the fact that the time sensitive L1 processing task requirements of the modem function are more likely to be executed by the DSP core 51 than if these tasks were executed by the multi-tasking operating system 65 on the host unit 60. In addition, the partitioning of L2 and L3 into the host unit is supported by the fact that the L2 and L3 processing tasks typically have relatively low processing requirements, and as a result, such tasks are better serviced by the general purpose host unit than by a traditional signal processor unit. The task partitioning between different units may also be defined where the communication between units has sufficiently low bandwidth and low latency that the separation into different units can be tolerated, such as occurs between L1 layer tasks and L2 layer tasks.

The partitioning of the processing tasks for the signaling protocol layers between the baseband processing unit and the host unit as described herein represents an exemplary illustration based on a specific protocol, and those skilled in the art will appreciate that a variety of layer partitions may be defined in light of the disclosure herein. For example, L1 and L2 tasks may be partitioned from the L3 tasks, so that the baseband processing unit handles L1 and L2 tasks, while the host unit handles L3 and other application tasks, depending on the specific communication protocol used by the wireless communications device 100. Examples of industry standard voice-band modem protocols are V.34, V42, V42bis, and V.90. Exemplary broadband protocols are the ISDN protocol, ITU-T I.432, and the Asymmetric Digital Subscriber Line (ADSL) protocol, T1.412 Issue 2. The application of the present invention is not limited to a particular voice band or broadband protocol.

As described herein, the partitioning of the signaling protocol layer tasks enables a relatively small embedded BBP memory to store the L1 processing tasks, such as the L1 background tasks relating to the modem state machines, the L1 frame interrupt routines and the L1 sequencers for the radio drivers. Where these tasks would have otherwise been stored with the other processing tasks in a larger memory (such as an external flash memory), the L1 programming requirements alone can be stored in a smaller memory, such as a flash ROM memory 54 on the baseband processor 50. As will be appreciated, the L1 and DSP tasks are relatively stable routines that can safely and efficiently be stored in a ROM memory. Of course, there may be occasions where the firmware must be altered or updated.

To allow updates, corrections or other adjustments to the software tasks stored in the ROM (such as the L1 layer tasks), the baseband processor 50 may provide a patching mechanism which includes an on-chip patch RAM 53 for storing patch code or data that is used to patch or change the software stored in the BBP ROM memory 54 by using the patch code or data in place of the code which previously existed in the BBP ROM memory 54. In a selected embodiment, the patching mechanism updates the firmware by downloading the patch data or code from the host unit 60 at system startup, reset or initialization. Once the patch data is stored in the patch RAM 53, the baseband processor unit 50 sends an acknowledge signal to the host unit 60 if the patch is accepted. Of course, other implementation details are contemplated. For example, the software stored in the BBP ROM memory 54 may include a mechanism that will write the data supplied in a patch to the address supplied in a patch so that all or part of every function stored in the ROM 54 may be replaced by new code supplied in a patch that is copied into the patch RAM 53. As will be appreciated, it is not required that every function stored in ROM 54 be patched, and the patching mechanism may maintain a list of patchable functions that is specifiable at the build time of the ROM software.

As indicated above, patches may be downloaded as one or more patch signals from the host unit 60 over a link 59. Each patch signal may include a patch consisting of the patch ID (PID) 53a, the patch address (PA) 53b, the patch length (PL) 53c and the patch data (PD) 53d. The patch ID 53a may be used to identify a patch for tracking and description purposes (e.g., identifying a patch as experimental or final). The patch address 53b may be used to specify the first memory address (e.g., the address in ROM 54) that the patch is to be applied to using a software memory address for any location in the BBP memory or I/O space. The patch length 53c specifies the quantity (e.g., in bytes) of the code to be replaced by the patch, and should equal the amount of the patch data 53d that is supplied to replace the data that exists in the BBP memory. For security purposes, the patch mechanism may provide for encryption and authentication of patches that are downloaded so that the baseband processor unit 50 includes software for decrypting and authenticating patches that have been encrypted and/or authenticated at the host unit 60.

In accordance with selected embodiments of the present invention, the memory resource count in the wireless communication device 100 may also be reduced by eliminating the need for a shared memory in the baseband processing unit 50. In conventional systems, shared memories were included between the DSP and MCU in the baseband processor, or were included between the baseband processor and the applications processor. Instead of working off a shared memory, the wireless communication device 100 uses local memories in each processing unit, such as the smaller embedded memory 52-54 that is used by the baseband processor, or the DDR SDRAM 63 and a large flash memory unit 64 that is used by the host or applications processor unit 60. However, when such a split memory architecture is employed, a memory transport protocol is required to interface between different tasks processing the same underlying data on different processing units. The memory transport protocol may also be used in other split memory situations, such as where different layers on different processing units are operating on the same underlying data. To address these situations, the present invention provides a memory transport mechanism 55, 62 on each processing unit that enables data from one task on a first processing unit (e.g., AP unit 60) to be sent over the link 59 to another task on another processing unit (e.g., BBP unit 50) where the processing units do not share a common memory. As will be appreciated, the memory transport mechanism 55, 62 may also enable data transfer in the other direction or in both directions.

Figure 3:
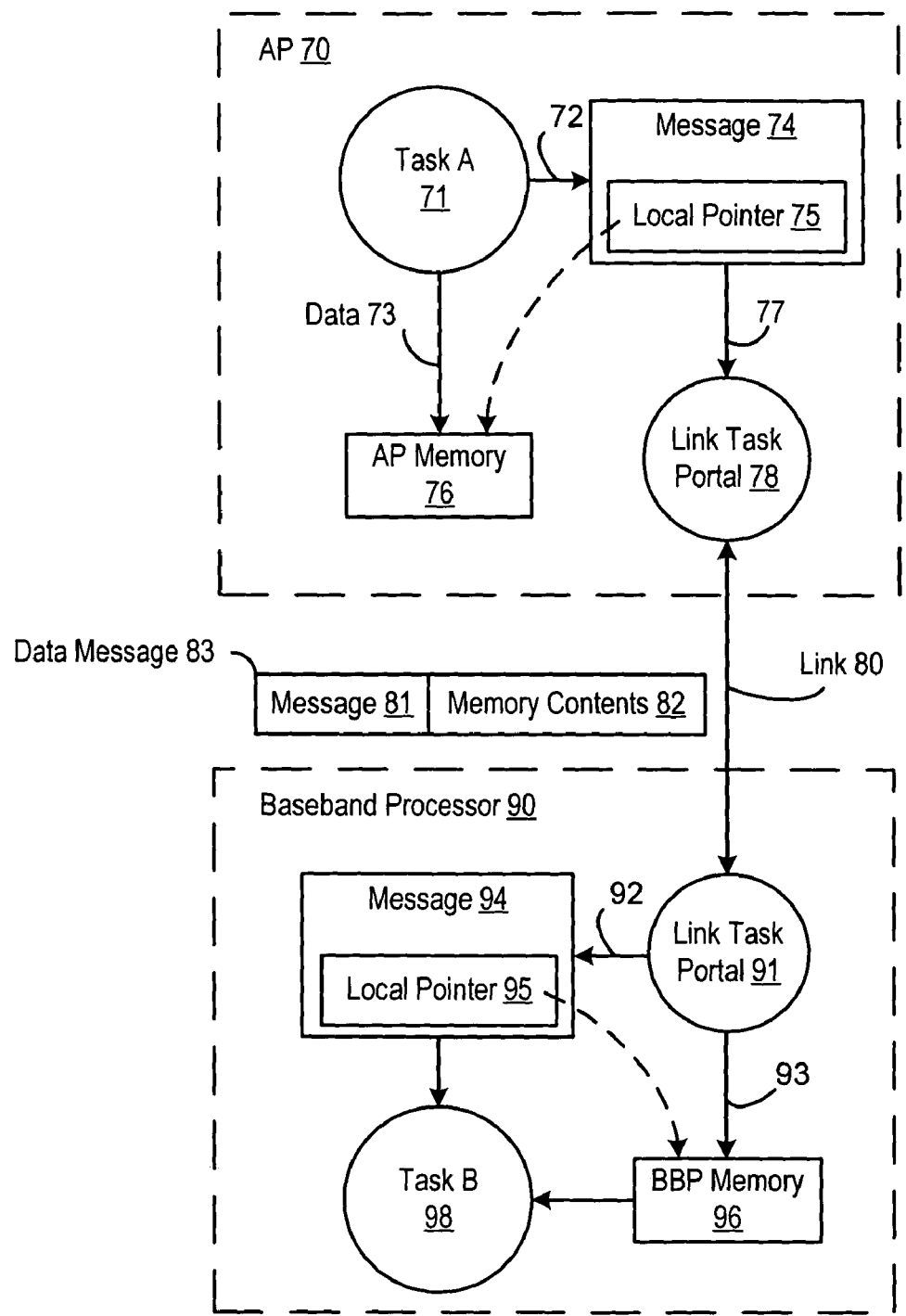
FIG. 3 shows a simplified diagrammatic depiction of a memory transport system for use with split memory systems.

An illustrative implementation of the memory transport mechanism is illustrated in FIG. 3 which depicts a simplified diagram of a communication system constructed of a first processor (e.g., application processor 70) that is connected by a communication link 80 to a second processor (e.g., modem or baseband processor 90). The first processor has a first local memory device (e.g., AP memory 76) for storing program instructions or data or PHY layer coding associated with various tasks executed on the first processor. For example, if a first task (e.g., Task A 71) collects audio data samples from a microphone peripheral (not shown) connected to the first processor, the data may be stored in the first local or AP memory 76, as indicated by line 73.

If the next layer or task (e.g., audio data encoding or filtering Task B 98) to be performed on the data 73 is to be handled at another processor (e.g., baseband processor 90), then the data must be transported over link 80 to the second processor. In accordance with the present invention, a message-based interface is used to transport the data over the link 80, such as an interface based on TTPCom's Electrical Man Machine Interface (EMMI) test interface, though other memory-based interfaces may be used, depending on the specific implementation details of the wireless communication device. The EMMI interface is specified in TCG 8249 Rev 0.4, and is incorporated herein by reference in its entirety as is fully set forth herein. In this EMMI-based implementation, the memory transport protocol extends the message structure of EMMI protocol to allow the transport of additional data entities (such as audio streams, encrypted data streams, patch system data, etc.), and provides a way to migrate from a function-call based interface (which transfers data via references to a shared memory) to a message-based interface which copies data over system boundaries using local memory pointers.

An exemplary embodiment of the memory transport system and methodology is illustrated in FIG. 3, where a message 74 is generated upon completion of a first task (Task A 71) (as indicated at line 72) and storage of its data 73 in first local memory 76. The message 74 includes a local pointer 75 to the location of the data 73 stored in the first local memory 76. In addition, the message 74 may identify other aspects of the data 73, including its size, format, encoding type, etc., and may also include control information or other data or instructions required by the next task (Task B). Finally, a copy of the actual data 73 from the local memory 76 (referred to as the memory contents) is appended to or included in the message 74 to form a data message 83 which is then sent to a link task portal 78 (as indicated at line 77), which acts as a proxy for any data messages that must cross over the link 80 to or from a task on the second processor 90.

The data message 83 to be transported over the link 80 may be formatted and structured in a variety of ways, provided that the data message 83 includes at least a message portion 81 and memory contents portion 82. For example, a data message 83 may include a source field, a destination field, a length field, an ID field and a body field. When the data message 83 relates to a task to be performed across the link, the source field identifies the source task (i.e., where the data message originates), the destination field identifies the destination task (i.e., the task on the other side of the partition), the length field identifies the length of the memory contents portion, the ID field identifies the data message, and the body field contains the memory contents portion being transported in the data message. As will be appreciated, other fields and formatting structures may be used. In addition, the message transport protocol of the present invention may be used to transport data in both directions across the link 80.

At the second processor 90, a link task portal 91 receives any data messages transported over the link 80. At the portal 91, the data messages are unpacked so that the message portion 94 is extracted (as indicated at line 92), and the memory contents or data portion is stored in the second local or BBP memory 96 (as indicated at line 93), which may be an embedded memory or an associated external memory device for storing data. Once the memory contents are stored in the second local memory 96, a new local pointer 95 is inserted in the message 94 in place of the original local pointer 75. The message 94 is then ready to be processed by the next Task B 98, which uses the new local pointer 95 to retrieve the task data 93 from local memory 96. With this memory transport protocol, the second processor 90 can operate independently of the first processor 70, each using their own local memory version of the task data. Indeed, the first processor 70 and second processor 90 can each run different tasks using different operating systems by transporting data over the link 80 and using local pointers to keep track of the data in the respective local memories.

As will be appreciated in the illustrated embodiment, the memory transport protocol described herein essentially causes a copy of the data stored in a first local memory or buffer 76 to be transported over the link 80 for storage in the second local memory or buffer 96. As a result, the first local memory 76 may be filled with data that has already been passed to the second processing unit and that is no longer needed by the first processing unit. To remove unneeded data from the first local memory, the link task portal 78 may be configured to destroy any buffer entry in the local memory 76 once the message data containing a copy of the buffer entry is transported over the link 80. In this way, old data stored in the first local memory is cleaned out after data message transport.

The particular embodiments disclosed above are illustrative only and should not be taken as limitations upon the present invention, as the invention may be modified and practiced in different but equivalent manners apparent to those skilled in the art having the benefit of the teachings herein. Accordingly, the foregoing description is not intended to limit the invention to the particular form set forth, but on the contrary, is intended to cover such alternatives, modifications and equivalents as may be included within the spirit and scope of the invention as defined by the appended claims so that those skilled in the art should understand that they can make various changes, substitutions and alterations without departing from the spirit and scope of the invention in its broadest form.

What is claimed is:

1. A wireless communications device, comprising:
   a first application central processing unit for performing layer two and layer three signaling protocol tasks, comprising a first local memory for storing application programs and layer two and layer three signaling protocol instructions;
   a second modem processing unit for performing layer one signaling protocol tasks, comprising a second embedded local memory for storing layer one signaling protocol instructions; and
   a memory transport unit for transporting a copy of data stored in a local memory of a source processing unit to a local memory of a destination processing unit using a message-based interface, where the source processing unit and destination processing unit do not share a common memory, where the memory transport unit generates a first message comprising a copy of data stored in the local memory of the source processing unit and a first local memory pointer to a local memory address for storing said data in the source processing unit such that a memory transport unit at a destination processing unit, in response to receiving the first message, stores a copy of the data in a local memory of the destination processing unit and generates a second message comprising a second local memory pointer to a local memory address of the data stored in the destination processing unit.

2. The wireless communications device of claim 1, where the first application central processing unit comprises a MIPS CPU core and the first local memory comprises a DDR SDRAM memory that is larger than the second embedded local memory.

3. The wireless communications device of claim 1, where the first application central processing unit comprises a MIPS CPU core and the first local memory comprises a flash memory that is larger than the second embedded local memory.

4. The wireless communications device of claim 1, where the second modem processing unit comprises a single DSP core.

5. The wireless communications device of claim 1, where the second embedded local memory comprises a RAM memory that is smaller than the first local memory.

6. The wireless communications device of claim 1, where the second embedded local memory comprises a ROM memory that is smaller than the first local memory.

7. The wireless communications device of claim 6, where the ROM memory stores the layer one signaling protocol instructions.

8. The wireless communications device of claim 1, where the second embedded local memory comprises a patch RAM for storing patch code that is used to patch software stored in the second embedded local memory.

9. The wireless communications device of claim 1, where the second embedded local memory comprises:
   a read-only memory for storing firmware for the second modem processing unit; and
   a random access memory for storing patch code that is used to patch the firmware stored in the second embedded local memory;
   where the firmware includes instructions that cause the second modem processing unit to write patch data from the patch code to an address in the read-only memory specified by the patch code so that all or part of every function stored in the read-only memory may be replaced by patch data supplied by the random access memory.

10. A communication system, comprising:
    a general purpose application processor for processing memory-intensive tasks comprising layer two and layer three signaling protocol tasks stored in an external local memory for storing application programs to be run on the general purpose application processor, said general purpose application processor comprising a first memory transport unit for transporting a copy of data stored in a local memory of the general purpose application processor using a message-based interface; and
    a baseband processor for processing processor-intensive tasks comprising layer one signaling protocol tasks stored in an embedded local memory comprising an RAM memory and a ROM memory, said baseband processor comprising a second memory transport unit for receiving the copy of data stored in the local memory of the general purpose application processor using the message-based interface;
    where the first memory transport unit at the general purpose application processor generates a first message comprising a copy of data stored in the local memory of the general purpose application processor and a first local memory pointer to a local memory address for storing said data in the general purpose application processor, and where the second memory transport unit at the baseband processor, in response to receiving the first message, stores a copy of the data in a local memory of the baseband processor and generates a second message comprising a second local memory pointer to a local memory address of the data stored in the baseband processor.

11. The communication system of claim 10, where the general purpose application processor comprises a MIPS CPU core and the external local memory comprises a memory that is larger than the embedded local memory.

12. The communication system of claim 10, where the baseband processor comprises RISC processor with DSP instructions that performs L1 signal processing tasks.

13. The communication system of claim 10, where the ROM memory stores layer one signaling protocol instructions.

14. The communication system of claim 10, where the embedded local memory comprises a patch RAM for storing patch code that is used to patch software stored in the embedded local memory.

* * * * *